United States Patent Office 3,672,774
Patented June 27, 1972

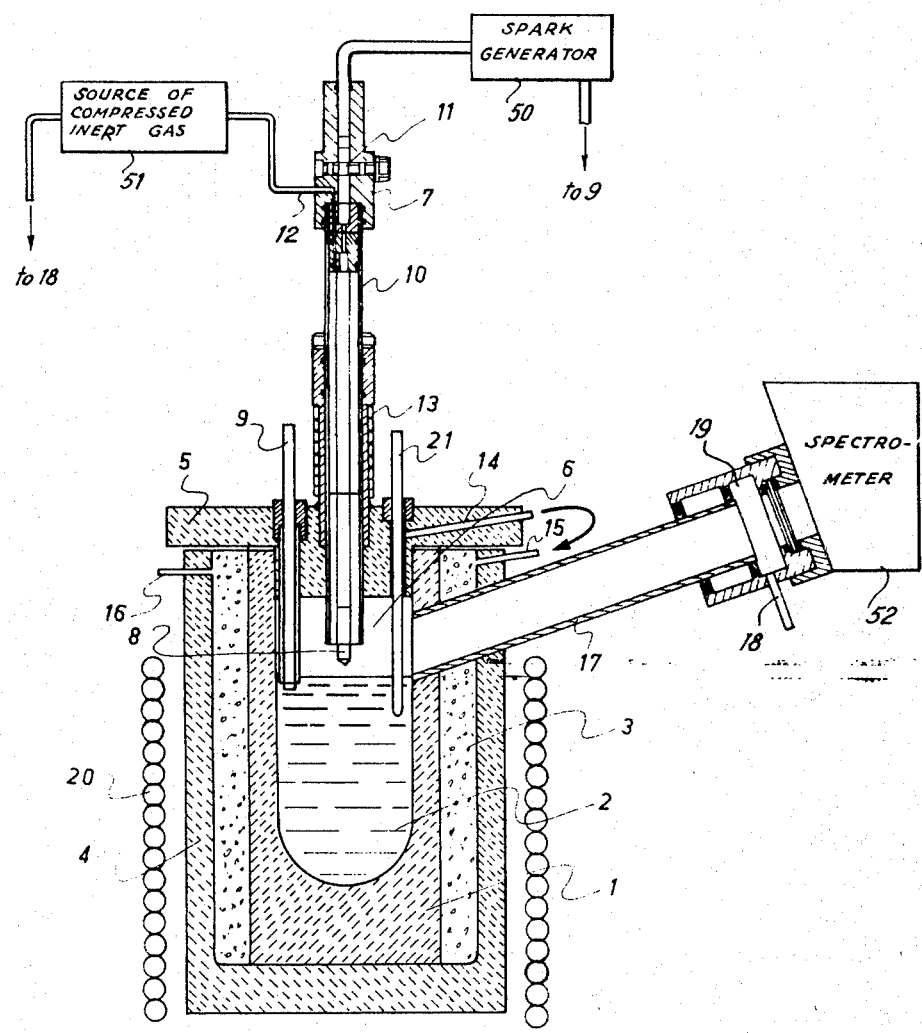

3,672,774
APPARATUS FOR SPECTRAL ANALYSIS OF MOLTEN SUBSTANCES
Milan Bojic, Metz, and Daniel Jorre, Bougival, France, assignors to Institut de Recherches de la Siderurgie Francaise, Saint-Germain-en-Laye, France
Filed Dec. 7, 1970, Ser. No. 95,568
Claims priority, application France, Dec. 12, 1969, 6943156
Int. Cl. G01j 3/02, 3/30
U.S. Cl. 356—86    10 Claims

ABSTRACT OF THE DISCLOSURE

Apparatus for direct spectrometric examination of molten metals or the like has a crucible which is to be partially filled with molten material and a jacket defining with the crucible a compartment which surrounds the crucible. The jacket has a closure for the upper ends of the compartment and of a chamber in the crucible above the exposed surface of molten material. A compressed neutral gas is circulated through the chamber and thereupon through the compartment, and the closure is traversed by two electrodes one of which dips into molten material. The electrodes are connected to the poles of a generator which produces sparks between the exposed surface of molten material and the tip of the other electrode. The thus produced light is directed for the purposes of analysis into a spectrometer by way of a duct which extends from an opening in the crucible and admits some compressed gas into the chamber above the exposed surface of molten material. The remaining gas is admitted through the holder for the other electrode which is adjustable toward and away from the exposed surface of molten material.

BACKGROUND OF THE INVENTION

The present invention relates to apparatus for the examination of molten metals, alloys and/or other molten materials, and more particularly to improvements in apparatus for direct spectrometric examination of molten materials, such as iron or steel.

It is known to resort to spectrography for detection of impurities or additives in metals or alloys. For example, it is customary to subject samples to spectrographic analysis during refining or other treatment of metals or alloys and to use the results of such analysis for regulating the percentages of certain ingredients. Samples are withdrawn from molten material at regular or irregular intervals, and the thus withdrawn samples are subjected to a spectrographic analysis while the treatment of the bulk of molten material is interrupted to await the results of the analysis. The interval which is required for the analysis proper is rather short; however, the conditioning of samples prior to analysis consumes much more time. For example, if the entire test (including conditioning and analysis) takes up four to six minutes, the major part of such time is spent for solidification of the withdrawn sample and for polishing of one or more surfaces on the solidified body. Additional losses in time will occur if (as is customary) the spectrometer is remote from the refining furnace.

Such losses in output due to periodic testing are especially high when the time which is required for the preparation and actual analysis of a sample constitutes a relatively high percentage of the total time which is needed to treat a body of molten metal or the like. Certain siderurgical operations, such as refining of iron under oxidizing conditions can be completed within twenty minutes. If the conventional analysis of a sample requires 4-6 minutes, the losses in the output of steel are extremely high.

The situation is further aggravated when molten iron or other molten materials are treated in a continuous operation. The testing of samples taken from furnaces for continuous treatment of molten materials does not cause losses in output. However, in the absence of testing, the composition of the ultimate product is likely to deviate considerably from the desired optimum composition. It is therefore highly desirable to provide a method and apparatus for direct, reliable and reproducible examination of molten materials, i.e., without solidification, polishing and/or other time-consuming preliminary treatment of samples prior to actual analysis. It is further known that an analysis which is carried out upon a solidified sample several minutes after withdrawal of the sample from a bath of molten material is likely to furnish misleading results because the composition of the sample might not be indicative of the composition of the main body or bulk of molten material. The phenomenon of segregation and precipitation of phases as a result of solidification contributes to unreliability of analyses of certain materials, such as certain types of steel.

It was further proposed to collect and to thereupon subject to a spectrographic analysis spectral lines which are characteristic of certain ingredients of molten materials. Such spectral lines are produced as a result of an electric discharge which takes place between the surface of molten material and an electrode. For example, it is known to subject to a spectrographic analysis spectral lines in the light which is emitted by an electrode arc in an arc furnace. Such attempts have met with little practical success for a number of reasons. First of all, the arc should be produced between the exposed surface of molten material and the electrode because the results of spectrographic analysis are erroneous and misleading if the surface of molten material (such as iron or steel) is covered with a layer of slag. Secondly, the atmosphere above the exposed surface of molten material must not alter or otherwise influence the emitted light. The range of frequencies of spectral lines of ingredients of steel is in the range of 1,650–2,850 angstroms. The presence of certain gaseous substances in the atmosphere in which the arc is formed suffices to cause a total absorption of certain parts of this range. Furthermore, the presence of oxygen in the atmosphere where the arc is formed is particularly detrimental. Still further, the atmosphere above the molten material in an industrial furnace cannot be controlled with a necessary degree of accuracy by resorting to presently known means. The composition of such atmosphere varies considerably; it normally contains varying amounts of oxygen, carbon monoxide gas, carbon dioxide gas, various metallic fumes and vapors which interfere with the transmission of light from the arc to the spectrometer and/or other deleterious ingredients. The situation is further aggravated when the melting point of the material to be treated is high. All this has led to the conclusion that a direct analysis of molten materials in an arc furnace or the like seldom produces satisfactory results.

Still another problem arises in connection with the mounting of the spectrometer. The spectrometer is normally highly sensitive to elevated temperatures, particularly to such temperatures (in the region of 1,600° C.) which are necessary for refining of iron or steel. For the foregoing reasons, the presently known apparatus for direct examination of molten material have met with little commercial success.

SUMMARY OF THE INVENTION

An object of the invention is to provide a novel and improved apparatus for direct, accurate, rapid and reproducible spectrometric analysis of molten materials, particularly molten metals and alloys.

Another object of the invention is to provide the apparatus with novel means for regulating the atmosphere above the exposed surface of a body of molten material prior to and during the analysis.

A further object of the invention is to porvide an apparatus wherein the spectrometer is not in danger of being damaged due to elevated temperature of molten material and which can be converted for examination of a wide variety of molten materials.

An additional object of the invention is to provide an apparatus which consumes relatively small amounts of energy, which can be used for the analysis of molten materials without necessitating a solidification and/or other preliminary treatment of samples, and which can be set up in close proximity of a metallurgical furnace so that the results of analysis can be immediately utilized to regulate the percentage of certain ingredients if the detected percentage of such ingredients deviates from the desired percentage.

The improved apparatus is used for direct spectrometric analysis of molten materials and comprises a vessel, such as a crucible, for reception of a supply of molten material to be analyzed, the supply having an exposed top surface and filling only a portion of the vessel so that the interior of the vessel forms a chamber above the exposed surface of molten material, a closure which is secured to the vessel to seal the chamber from the surrounding atmosphere, an electrode extending through the closure and into the chamber to a point above the exposed surface of molten material, spark generating means having a first pole connected with the electrode and a second pole connected with the molten material in the vessel to generate sparks between the electrode and the exposed surface with attendant emission of light, means for circulating in the chambers a neutral gas which expels metallic vapors, fumes, oxygen and/or other undesirable gaseous substances and permits unimpeded travel of emitted light in a desired direction, spectrometer means located without the vessel, and window means provided on the vessel for directing the emitted light into the spectrometer means whereby the latter subjects such light to an analysis in a manner well known from the art.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings.

BRIEF DESCRIPTION OF THE DRAWING

The single figure is a schematic sectional view of an apparatus which embodies the invention.

DESCRIPTION OF THE PREFERRED EMBODIMENTS

The apparatus which is shown in the drawing comprises a vessel 1, here shown as a crucible containing a bath 2 of a molten material which requires spectral analysis, especially a molten metal or alloy (such as iron or steel). The configuration of the crucible 1 is such that it facilitates a controlled discharge of an electric spark between an electrode 8 which is located above the exposed (uncovered) top surface of molten material and the exposed surface. The light which is emitted in response to such discharge is thereupon examined by a suitable spectrometer 52. The discharge takes place in a spark chamber 6 which is disposed above the exposed surface of molten material in the crucible 1. The material of the crucible is selected in such a way that it can resist the temperature and the corrosive action of molten material forming the bath 2 as well as the temperature and action of gases in the spark chamber 6. Furthermore, when the top of the chamber 6 is sealed, the material of the crucible 1 should prevent uncontrolled escape of gases from and uncontrolled entry of gases into the chamber 6. The atmosphere in the chamber 6 should permit unimpeded radiation of light which is produced on generation of sparks and should remain neutral with respect to the ingredients of the bath 2, i.e., the gases in the chamber 6 should not influence or alter the composition of the bath and should be entirely free of oxygen. As a rule, the gas pressure in the chamber 6 should slightly exceed the atmospheric pressure.

In order to prevent penetration of any oxygen into the chamber 6, the crucible 1 is preferably surrounded by an envelope or jacket 4 which defines therewith a compartment 3 for circulation of neutral gases. The compartment 3 can be filled with a gas-permeable refractory material and communicates with the chamber 6 so that gases which issue from the chamber 6 enter the compartment 3 and are thereupon discharged into the atmosphere or collected in a manner not shown in the drawing. The crucible 1 preferably consists of a refractory material whose nature depends on the characteristics of the molten substance. For example, a first refractory material will be used for the crucible if the latter is to contain a bath of molten tin, and a different refractory material is used if the crucible is to contain molten steel. The selection of the neutral gas which circulates in the chamber 6 and compartment 3 depends on the range of the substances whose presence in the bath 2 is to be determined and regulated. For example, the gas can be pure nitrogen, a mixture of nitrogen with argon, a mixture of nitrogen with helium, and/or others.

In the illustrated embodiment, the crucible 1 consists of alumina and the compartment 3 is assumed to be filled with a gas-permeable refractory material. Such material is packed between the external surface of the crucible 1 and the internal surface of the envelope 4. The latter also consists of alumina and the refractory material in the compartment 3 consists of cellular alumina. When the apparatus is in use, the open upper ends of the chamber 6 and compartment 3 are closed and sealed by a lid or closure 5 which can be said to form a removable part of the envelope 4. The closure 5 has a boss which extends into the uppermost part of the chamber 6.

The median portion of the closure 5 supports an electrode holder 7 which comprises a tube or sheath 10 consisting of quartz and extending through the cover and into the chamber 6. The tube 10 surrounds the electrode 8 whose lower end portion is located at a level above the exposed surface of molten material in the chamber 6. The electrode 8 consists of pure iron and can be moved up or down by an adjusting device 11 on the holder 7. When the spark producing circuit is completed, the spark develops between the exposed surface of the bath 2 and the lower end portion of the electrode 8. The latter is connected to one pole of a conventional spark generator 50. The other pole of the generator 50 is connectable with the upper end portion of a second electrode 9 which extends through the closure 5 and chamber 6 so as to dip into the bath 2. It is clear that the closure 5 is provided with suitable seals (shown but not numbered) which prevent communication between the chamber 6 and the atmosphere along the surfaces of the parts 8, 9 and 10. When the bath 2 consists of molten iron or steel, the second electrode 9 preferably consists of a material known as cermet which is resistant to corrosion and elevated temperatures and is a good conductor of electric current. An electrode consisting of cermet can establish satisfactory contact between the respective pole of the generator 50 and the bath 2 for several hours.

It is desirable to fill the crucible 1 to the same level during each of a series of successive tests. This renders it possible to properly direct the emitted light toward the spectrometer 52. If the level of molten bath 2 in the crucible 1 is too low, the electrode 8 must be lowered toward the upper surface of the bath and the spark will emit light which cannot be properly directed toward the spectrometer. If the crucible 1 is always filled to the same level, the axial position of the electrode 8 can remain unchanged. In such instances, the adjusting means 11 for the electrode 8 constitutes an optional feature of the electrode holder 7. The adjusting means 11 is manipulated while the user observes the level of molten material in the crucible 1 by way of an optical system which forms part of the spectrometer 52.

The electrode holder 7 is further provided with an inlet 12 which admits compressed neutral gas from a suitable source 51; such gas flows from the inlet 12 and through the interior of the tube 10 to enter the chamber 6. A coil 13 which contains circulating water or another suitable coolant surrounds the tube 10 above the closure 5.

The closure 5 is further provided with a channel 14 for evacuation of gas from the chamber 6; such gas is caused to enter the compartment 3 by way of a conduit 15 and is discharged from the compartment 3 by way of an outlet 16 provided in the envelope 4. A portion of the conduit 15 also extends through the envelope 14.

In the embodiment which is shown in the drawing, the observation window which directs the light emitted from the spark in the chamber 6 comprises an elongated pipe or duct 17 which may but need not be of circular outline. The outer end of the duct 17 is closed by a transparent sealing member 19 which permits the emitted light to pass on to the spectrometer 52. It is clear that the duct 17 can be reduced in length or replaced by a simple window including registering openings provided in the parts 1, 4 and in the material filling the compartment 3 between such openings; the opening then contain a suitable sealing member corresponding to the member 19. For example, the member 19 can consist of quartz or fluorite. As a rule, the path for emitted light is selected in such a way that the spectrometer 52 receives a pencil of light. The aforementioned optical system (not shown) can be mounted in or on the duct 17 to permit observation of the level of molten material in the crucible 1 while the operator manipulates the adjusting device 11 for the electrode 8. Such optical system can also serve to permit observation of the quality of the spark between the exposed surface of molten material and the tip of the electrode 8. As further shown in the drawing, the outer end portion of the duct 17 is provided with an inlet 18 which is preferably connected to the source 51 and serves to admit compressed neutral gas into the interior of the duct 17. Such gas serves to sweep or clean the duct and to clean the inner side of the sealing member 19 by repelling metallic fumes or vapors which tend to raise in the duct 17 and to deposit on the member 19. The thus admitted gas enters the chamber 6 and is circulated and evacuated in the same way as the gas which enters the chamber 6 by way of the tube 10.

In certain instances, the molten material in the crucible 1 must be maintained at a predetermined temperature. Therefore, the apparatus is preferably provided with a conditioning device 20 which may constitute a heater or a cooler and preferably comprises a coil which surrounds the envelope 4. For example, the device 20 will serve as a heater when the material of the bath 2 is molten iron or steel. However, it is equally possible to employ other types of heating or conditioning devices, such as an induction heater (particularly for molten iron or steel) having a coiled solenoid surrounding the envelope 4 and connected to a generator, not shown. It is also possible to employ as a crucible an electric resistance furnace, for example, a furnace with molybdenum or nickel-chrome resistances. If the resistances consist of molybdenum, care should be taken to maintain them in an atmosphere which is free of oxygen.

The action of the conditioning device 20 is preferably regulated in dependency on the temperature of the bath 2. To this end, the apparatus preferably comprises a temperature measuring device 21 which can be introduced through an opening in the closure 5 so as to reach the mass of molten material in the crucible 1. For example, the device 21 can comprise a thermocouple which is protected against excessive heat in a manner known per se; it is also possible to employ an optical pyrometer.

THE OPERATION

As soon as the sample is introduced into the crucible 1, the closure 5 is sealingly connected with the crucible and with the envelope 4. The source 51 is caused to admit a neutral gas by way of the inlets 12 and 18. Such gas is injected at a slightly elevated pressure and expels from the chamber 6 all undesirable gaseous substances. The generator 50 is then caused to produce sparks and the pencil of emitted light is caused to travel through the duct 17 and sealing member 19 into the spectrometer 52. It was found that an analysis can be completed within about two minutes, i.e., within a period which is a small fraction of the period (four to six minutes) required to complete an examination with presently known apparatus.

Tests with the improved apparatus in connection with spectral analysis of samples containing 2.5–3 kilograms of molten iron or steel have shown that the apparatus can be used for metering, with a high degree of accuracy and reproducibility, the emission of a variety of metallic and/or metalloid ingredients, particularly silicon, manganese, nickel, chromium, molybdenum, carbon, phospher, sulfur and/or others. The spectrometer 52 was used for spectral examination of light in the ultraviolet region of the spectrum. In accordance with a specific example, the light produced by a low-tension spark in a nitrogen atmosphere was used to accurately meter the presence of carbon in molten iron at a temperature of 1,550° C. and in molten steel at a temperature of 1,620° C.

It is clear that the improved apparatus is susceptible of many additional uses and modifications without departing from the spirit of the invention. Thus, the apparatus can be used for spectral analysis of a practically unlimited number of various molten substances whose temperature may vary within a wide range. The apparatus is especially suited for examination of molten metals and alloys, particularly for rapid examination of metals or alloys while such substances undergo a refining or other treatment.

The purpose of the compartment 3 is to reduce the likelihood of penetration of atmospheric air into the chamber 6 above the exposed surface of the bath 2. Circulation of an inert gas in the compartment 3 serves the same purpose; since the gas is maintained at an elevated pressure, it prevents penetration of air through the envelope 4 and into the refractory material which fills the compartment 3. The source 51 can contain a supply of argon, helium, nitrogen and/or other suitable gases.

The electrode 9 in the closure 5 can be omitted if the generator 50 is connected with the bath 2 in another way, for example, through the envelope 4, compartment 3 and the wall of the crucible 1. As a rule, the tip of the electrode 8 is placed into close proximity of the exposed (uncovered) surface of the bath 2.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an apparatus for direct spectrometric analysis of molten metal, a combination comprising a vessel for reception of a supply of molten material to be analyzed, such supply filling a portion of the vessel so that the interior of said vessel above said supply forms a chamber, said vessel comprising a crucible consisting of refractory material and a jacket surrounding said crucible and defining therewith a compartment in communication with said chamber; a closure secured to said vessel and forming part of said jacket to seal said chamber and said compartment against entry of atmospheric air; an electrode extending through said closure and into said chamber and ending above the level of the exposed surface of molten material; spark generating means having a first pole connected with said electrode and a second pole connected to said supply of molten material to generate sparks between the exposed surface and said electrode with attendant emission of light; means for circulating an inert gas in said chamber and said compartment; spectrometer means located outside said vessel; and window means provided on said vessel for directing said light to said spectrometer means for analysis.

2. A combination as defined in claim 1, further comprising a body of gas-permeable material in said compartment.

3. A combination as defined in claim 1, wherein said circulating means comprises at least one inlet for admission of compressed neutral gas into said chamber whereby the thus admitted gas flows through the chamber, thereupon through said compartment and is evacuated from the compartment by way of outlet means provided in said jacket.

4. A combination as defined in claim 1, wherein said window means comprises a duct extending from an opening in said vessel toward said spectrometer means, said circulating means having a gas-admitting inlet provided in said duct at a point remote from said opening so that the neutral gas which is admitted by way of said inlet sweeps through said duct and enters said vessel by way of said opening.

5. A combination as defined in claim 1, further comprising a second electrode connected to the second pole of said spark generator means and extending through said closure so as to dip into molten material in said vessel.

6. A combination as defined in claim 5, wherein at least a portion of said second electrode consists of cermet.

7. A combination as defined in claim 1, further comprising a holder for said electrode, said holder being mounted in said closure and having adjusting means for moving said electrode toward and away from the exposed surface of the supply in said vessel.

8. A combination as defined in claim 1, further comprising holder means for said electrode and means for cooling said holder means, said holder means being supported by said closure.

9. A combination as defined in claim 1, further comprising conditioning means cooperating with said vessel for maintaining the temperature of the supply of molten material in said vessel within a predetermined range.

10. A combination as defined in claim 4, wherein said window means further comprises a transparent sealing member extending spaced from said opening transversely through said duct and having a face facing said opening, and wherein said gas admitting inlet is adjacent said face so that the neutral gas admitted by way of said inlet sweeps first over said face to clean the latter before passing through said duct and entering said vessel by way of said opening.

References Cited

UNITED STATES PATENTS

| 3,188,180 | 6/1965 | Höller | 356—86 UX |

FOREIGN PATENTS

| 1,066,039 | 9/1959 | Germany | 356—86 |
| 650,666 | 7/1964 | Belgium | 356—86 |

RONALD L. WIBERT, Primary Examiner

F. L. EVANS, Assistant Examiner